United States Patent [19]

Moran et al.

[11] Patent Number: 4,515,825

[45] Date of Patent: May 7, 1985

[54] LOW FAT SPREAD AND PROCESS FOR PRODUCING SAME

[75] Inventors: David P. J. Moran, Covington; David G. Sharp, Putnoe, both of England

[73] Assignee: Lever Brothers Company, New York, N.Y.

[21] Appl. No.: 431,986

[22] Filed: Sep. 30, 1982

[30] Foreign Application Priority Data

Oct. 7, 1981 [GB] United Kingdom .................. 8130323

[51] Int. Cl.$^3$ .......................... A23D 3/00; A23D 3/02
[52] U.S. Cl. .................................... 426/603; 426/604; 426/583
[58] Field of Search ............... 426/602, 603, 604, 583, 426/613, 654

[56] References Cited

U.S. PATENT DOCUMENTS

| | | | |
|---|---|---|---|
| 3,490,919 | 1/1970 | Moran | 426/604 X |
| 3,729,325 | 4/1973 | Howard | 426/602 |
| 3,892,039 | 7/1975 | Scibelli et al. | 426/603 |
| 3,892,873 | 7/1975 | Kolen et al. | 426/613 X |
| 4,071,634 | 1/1978 | Wilton et al. | 426/604 |
| 4,366,180 | 12/1982 | Altrock et al. | 426/602 |
| 4,404,231 | 9/1983 | den Hollander et al. | 426/602 |

*Primary Examiner*—Robert Yoncoskie
*Attorney, Agent, or Firm*—Milton L. Honig; James J. Farrell

[57] ABSTRACT

Spreads containing 20-60%, preferably 30-50% fat are disclosed wherein there is (i) a dispersed phase consisting of a cream comprising water, oil present as droplets with an average diameter of 0.1-2 microns, a thickening agent and heat denatured whey protein as an emulsion stabilizer and (ii) a continuous fat phase. Said spreads are produced by a process involving (a) preparing a cream containing whey protein in substantially native state;

(b) heating said cream at 80°-95° C. to denature the protein;

(c) emulsifying the cream in a continuous fat phase and (d) cooling and texturizing the o/w/o emulsion obtained to produce a plastic spread.

27 Claims, No Drawings

LOW FAT SPREAD AND PROCESS FOR PRODUCING SAME

The present invention relates to an oil-in-water-in-oil emulsion (o/w/o emulsion) containing less than 80% fat, particularly a low calorie spread with a level of fat ranging from 20 to 60%, and ideally from 30–50%. An o/w/o emulsion is an emulsion in which the continuous phase is an oil or fat (these terms are meant to be interchangeable throughout the specification) and the dispersed phase consists of a natural or an artificial cream.

The main object of the present invention is to produce an o/w/o emulsion which on consumption gives a creamy sensation and a good flavour impact on the palate.

It is another object of the present invention to produce a spread which is stable and which retains its double emulsion (o/w/o) character during storage.

Applicants have found a spread and a process for its preparation which meet the above requirements to a great extent.

The fat spread with a level of fat ranging from 20 to 60% according to the invention comprises:

(i) a dispersed phase consisting of a cream comprising a protein essentially consisting of heat denatured whey protein, an oil which is present as droplets of an average diameter ranging from 0.1 to 2 microns and an appropriate amount of a thickening agent;

(ii) a continuous fat phase.

The use of whey protein allows the preparation of emulsions having an aqueous phase of a relatively low pH, i.e. a pH ranging from 3.5 to 5.5, which promotes bacteriological stability, without recourse to a protein-complexing agent, such as carboxy methyl cellulose or to a slow culturing procedure to avoid precipitation of the protein.

Another advantage associated with the use of whey protein is that it stabilized the cream at relatively low levels, i.e. at levels ranging from 0.1 to 2 wt.%, based on the total fat composition, in contrast to the much higher levels of milk protein emulsifier advocated in Dutch patent application No. 650,380 for the stabilization of o/w/o emulsions.

Applicants have found that an enhanced creaminess sensation on consumption of the spread is associated with the use of whey protein. It is therefore useful that the whey protein used is substantially free from other milk proteins such as casein.

The spreads according to the invention preferably contain a whey protein which has been obtained by membrane filtration of whey to remove low molecular components such as sugars, particularly lactose, which give an undesirable, sweet impression on consumption.

The whey protein used in the spreads according to the invention is denatured by a heat treatment carried out at a temperature ranging from 80° to 95° C.

The cream may further contain viscosity increasing agents or a gelling agent such as gelatin, starch, carboxymethyl cellulose, locust bean gum, carrageenan or mixtures thereof, at a level ranging from 0.05 to 5 wt.%.

Preferably gelatin is used because of its melting behaviour under conditions prevailing in the mouth, at a level preferably exceeding 1%.

Applicants have found that higher levels of gelatin, preferably ranging from 2.5 to 5 wt.%, resulted in relatively big dispersed phase cream drops, i.e. drops of an average diameter ranging from 10 to 40 microns and preferably from 30 to 40 microns, which promoted a sensation of creaminess of the product on the palate.

The continous fat phase of the emulsion contains an emulsifier or a mixture of emulsifiers. Preferably a mixture of a phospholipid such as lecithin and a partial glyceride is used.

The weight ratio of the oil present in the dispersed phase of the emulsion to the oil used in the continuous fatty phase ranges from 0.1 to 0.5 and preferably from 0.2 to 0.4.

The more fat is present in the dispersed phase, the more creamy the product is but the greater is the risk that some oil leakage will occur from the dispersed phase into the continuous phase. Preferably a cream is produced which contains less than 15 wt.% of oil, based on the total composition. Various fats and oils can be present in the continuous and dispersed phases. When a relatively high amount of fat is present in the dispersed phase, some leakage may occur. In that case it is preferred that the same oil or fat be used in both cases to prevent any leakage from affecting the properties of the final product.

However, in some instances it is advantageous that different fats are present in the dispersed and continuous phases, thereby providing a better control of textural properties. Thus, oils displaying a steep dilatation line, such as palmkernel oil, coconut oil or babassu oil, are preferably present in the cream to impart coolness to the product on consumption. When these fats are present as partially or wholly hydrogenated fats, they may achieve an enhanced creamy sensation on the palate.

The fat of the continuous phase consists generally of a plastic fat blend which may contain vegetable or animal fats or fractions thereof, part of which may have been hydrogenated or interesterified to achieve specific melting properties. A preferred fat blend would e.g. have the following fat solids profile measured by NMR (nuclear magnetic resonance) at various temperatures: $N_{10} = 40$–$60$; $N_{20} = 10$–$35$; $N_{35} \leq 2$.

The process according to the invention for producing low calorie spreads having a level of fat ranging from 20–60%, preferably 30–50%, comprises:

(i) producing a cream comprising a protein essentially consisting of whey protein, an oil which is present as droplets of an average diameter ranging from 0.1 to 2 microns and an appropriate amount of a thickening agent;

(ii) heating the cream to denature the protein;

(iii) emulsifying the cream in a fat phase and (iv) subjecting the o/w/o emulsion obtained to cooling and texturizing treatments to obtain a plastic spread.

It is preferable that the protein used for producing the cream be present in the native, undenatured state in the initial stage of the process. According to a preferred process a whey protein is used which has been obtained by membrane filtration. After the initial cream (o/w-emulsion) has been obtained, the temperature is raised to above 80° C. and preferably from 85° to 95° C., e.g. for 20 to 40 minutes, to denature the protein. This heat treatment raises the viscosity of the emulsion/cream, increases the stabilization of the o/w interface and by desolubilization decreases the tendency of the protein not at the o/w interface to destabilize the final cream in the fat spread.

The fine dispersion of oil (0.1–2 microns) in the cream is achieved by subjecting a mixture of the whey protein, water and oil to homogenization under a pressure ranging from 100-400 kg/cm² at a temperature higher than the temperature at which the oil starts melting.

According to a preferred embodiment a second homogenization step is carried out subsequent to step (ii) and prior to step (iii) to thoroughly reduce clumps of denatured protein and fat aggregates.

According to a preferred embodiment, the fat which constitutes the continuous phase of the emulsion is first fed into a rotating emulsification unit, whereafter the cream is proportioned to obtain a w/o-emulsion, which is subsequently subjected to cooling and texturizing treatments to plasticize the emulsion.

Cooling and texturizing can be carried out in Votator, Perfector, Kombinator or Complector apparatus.

The invention will now be illustrated in the following Examples.

EXAMPLE 1

Whey protein (1.66%) obtained by membrane filtration was dissolved in water (37 wt.%) at 60° C.

A fat blend (7.5 wt.%) at 60° C., containing flavour, was added to the protein solution and the mixture was subjected to high pressure homogenization at 250 kg/cm² to produce a cream in which the average size of the droplets was about 1 micron.

Gelatin (1.5 wt.%), dissolved in water (15 wt.%), was added to the cream. Further water was added to reach a level of 55.5 wt.%. The pH was adjusted to 4.7, using a 20% solution of lactic acid, and water-soluble flavours (0.1 wt.%) were added. The cream was pasteurized at 90° C. for 30 minutes to denature the whey protein. In order to disperse possible clumps, the cream was rehomogenized at a pressure of 70 kg/cm².

32.18 wt.% of the same fat blend used for preparing the cream was melted and to the molten blend was added 0.5 wt.% of fat-soluble flavours and a mixture of 0.2% monoglyceride and 0.03% lecithin. The blend was subsequently cooled to 40° C. in a holding tank and was then fed into a crystallizer, a so-called C-unit. The pasteurized cream was allowed to cool to 40° C. The cream was then proportioned in the C-unit and the emulsion was allowed to cool to 20°-25° C. while being rotated at 200 rpm.

The fat-continuous emulsion emerging from the C-unit was processed through a Votator sequence ACAC to obtain the final fat-continuous spread.

EXAMPLES 2-3

The procedure of Example 1 was repeated, except that the level of gelatin was increased to the following concentrations: 2.5%, 5%. The Instron test values on the gel, the flavour impact scores and the creaminess scores are summarized in Tables A and B.

TABLE A

| | Instron test values on gel | | | | |
|---|---|---|---|---|---|
| Gelatin on product* % | Yield point | Brittleness | Deformability | Thickness | Flavour Impact Score (1 = low– 9 = high) |
| 1.5 | 15.5 | 2.3 | 9.0 | 51.6 | 4 |
| 2.5 | 31.6 | 11.2 | 10.7 | 71.6 | 6 |
| 5.0 | 140.0 | 34.0 | 12.7 | 260.0 | 7 |

TABLE B

| Gelatin on product | Drop Size of Aqueous Phase in Product (μm) | Creaminess Score (1 low-5 high) |
|---|---|---|
| 1.5 | 10-12 | 2 |
| 2.5 | 15-20 | 2 |
| 5.0 | 30-40 | 3 |

We claim:

1. In a low fat spread comprising 20 to 60 wt.% fat, which comprises:
    (i) a dispersed phase consisting of a cream comprising a protein, an oil which is present as droplets of an average diameter ranging from 0.1 to 2 microns and an effective amount of a thickening agent sufficient to impart creaminess to the resulting spread; and
    (ii) a continuous fat phrase wherein the improvement consists of using heat denatured whey protein in the dispersed phase, the whey protein having been obtained by membrane filtration.

2. A spread according to claim 1, wherein the whey protein is present at a level ranging from 0.1 to 2 wt.%, based on the total composition.

3. A spread according to claim 1, wherein the thickening agent is present at a level ranging from 0.05 to 5 wt.%.

4. A spread according to claim 1, wherein the thickening agent consists of gelatin.

5. A spread according to claim 4, wherein gelatin is present at a level exceeding 1 wt.%.

6. A spread according to claim 5, wherein gelatin is present at a level ranging from 2.5 to 5 wt.%.

7. A spread according to claim 6, wherein the average diameter of the dispersed phase consisting of a cream ranges from 10 to 40 microns.

8. A spread according to claim 1, wherein the oil in the cream is present in a proportion of less than 15 wt.%, based on the total emulsion.

9. A spread according to claim 1, wherein the ratio of the oil in the cream to the oil constituting the continuous phase ranges from 0.1:1 to 0.5:1.

10. A spread according to claim 1, wherein the pH of the aqueous phase ranges from 3.5 to 5.5.

11. A spread according to claim 1, wherein the continuous fat phase has the following fat solids profile:

$$N_{10}=35-60; N_{20}=10-35; N_{35}=\leq 2.$$

12. A spread according to claim 1, wherein a phospholipid and a partial glyceride are present as emulsifiers in the continuous fat phase.

13. A process for producing a low fat spread containing 20 to 60 wt.% fat, which comprises
    (i) producing a cream comprising a protein consisting essentially of whey protein obtained by membrane filtration, an oil which is present as droplets of an average diameter ranging from 0.1 to 2 microns and an effective amount of a thickening agent;
    (ii) heating the cream to denature the whey protein;
    (iii) emulsifying the cream in a fat phase;
    (iv) subjecting the oil-in-water-in-oil emulsion obtained to cooling and texturizing treatments to obtain a plastic spread.

14. A process according to claim 13, wherein the cream is heated at a temperature ranging from 80° to 95° C.

15. A process according to claim 13, wherein the whey protein is incorporated at a level ranging from 0.1 to 2 wt.%, based on the total composition.

16. A process according to claim 13, wherein the cream is produced by applying homogenization under pressure.

17. A process according to claim 13, further comprising a homogenization step subsequent to heating step (ii) and prior to step (iii).

18. A process according to claim 13, wherein a thickening agent is incorporated in the cream at a level ranging from 0.05 to 5 wt.%.

19. A process according to claim 18, wherein gelatin as a thickening agent is incorporated in the cream.

20. A process according to claim 19, wherein gelatin is incorporated at a level exceeding 1 wt.%.

21. A process according to claim 20, wherein gelatin is incorporated at a level ranging from 2.5 to 5 wt.%.

22. A process according to claim 13, wherein the oil in the cream is incorporated in a proportion of less than 15 wt.%, based on the total emulsion.

23. A process according to claim 13, wherein the ratio of the oil in the cream to the oil constituting the continuous phase ranges from 0.1:1 to 0.5:1.

24. A process according to claim 13, wherein the pH of the aqueous phase is adjusted to a value ranging from 3.5 to 5.5.

25. A process according to claim 13, wherein the cream is emulsified in the continuous fat phase in the form of drops with an average diameter ranging from 10 to 40 microns.

26. A process according to claim 13, wherein a continuous fat phase is used which has the following fat solids profile:

$$N_{10}=35-60;\ N_{20}=10-35;\ N_{35}=\leq 2.$$

27. A process according to claim 13, wherein an emulsifying system is used in the continuous fat phase which consists of a phospholipid and a partial glyceride.

* * * * *